US010515283B2

(12) United States Patent
Kim

(10) Patent No.: US 10,515,283 B2
(45) Date of Patent: Dec. 24, 2019

(54) MOBILE DEVICE FOR IRIS BASED AUTHENTICATION AND CONTROLLING METHOD THEREOF

(71) Applicant: LG ELECTRONICS INC., Seoul (KR)

(72) Inventor: Sunghyun Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 34 days.

(21) Appl. No.: 15/611,324

(22) Filed: Jun. 1, 2017

(65) Prior Publication Data

US 2017/0351929 A1 Dec. 7, 2017

(30) Foreign Application Priority Data

Jun. 3, 2016 (KR) .................. 10-2016-0069661

(51) Int. Cl.
*G06K 9/00* (2006.01)
*G06T 3/40* (2006.01)
(Continued)

(52) U.S. Cl.
CPC ....... *G06K 9/00906* (2013.01); *G06K 9/0061* (2013.01); *G06K 9/00604* (2013.01);
(Continued)

(58) Field of Classification Search
CPC ............. G06K 9/00906; G06K 9/2027; G06K 9/00604; G06K 9/0061; G06K 9/00617;
(Continued)

(56) References Cited

U.S. PATENT DOCUMENTS 8,537,174 B2 * 9/2013 Capener ................... G09G 5/10
345/589
8,856,541 B1 * 10/2014 Chaudhury ............. G06F 21/32
382/115
(Continued)

FOREIGN PATENT DOCUMENTS

KR 10-2005-0088563 9/2005
KR 10-2014-0064080 5/2014
WO WO 2016/039582 3/2016

OTHER PUBLICATIONS

International Search Report and Written Opinion dated Sep. 13, 2017 issued in Application No. PCT/KR2017/005731 (Full English Text).

*Primary Examiner* — Ming Y Hon
(74) *Attorney, Agent, or Firm* — KED & Associates LLP

(57) ABSTRACT

Disclosed are a mobile device and controlling method thereof. The present invention includes a memory configured to register a first iris image, an illumination sensor configured to sense an external illuminance of the mobile device, a display configured to emit a light from a preset region, a camera configured to detect either a second iris image or a pupil image, and a controller configured to control the memory, the illumination sensor, the camera and the display and control the display to display a message for guiding a change of an eye according to the external illuminance sensed by the illumination sensor, wherein the message for guiding the change of the eye is changed according to the sensed external illuminance.

14 Claims, 15 Drawing Sheets

(51) Int. Cl.
  *G09G 5/10* (2006.01)
  *G06K 9/20* (2006.01)
  *G06F 21/32* (2013.01)

(52) U.S. Cl.
  CPC ..... *G06K 9/00617* (2013.01); *G06K 9/00919* (2013.01); *G06K 9/2027* (2013.01); *G06T 3/40* (2013.01); *G09G 5/10* (2013.01); *G06F 21/32* (2013.01); *G09G 2360/144* (2013.01)

(58) Field of Classification Search
  CPC ................ G06K 9/00919; G09G 5/10; G09G 2360/144; G06T 3/40; G06F 21/32
  See application file for complete search history.

(56) References Cited

U.S. PATENT DOCUMENTS

| | | | |
|---|---|---|---|
| 2008/0292144 A1* | 11/2008 | Kim | G06K 9/00604 382/117 |
| 2009/0278922 A1* | 11/2009 | Tinker | G06K 9/0061 348/78 |
| 2012/0075452 A1* | 3/2012 | Ferren | G02B 13/0065 348/78 |
| 2013/0063582 A1* | 3/2013 | Choi | G06K 9/00617 348/78 |
| 2013/0182915 A1* | 7/2013 | Hanna | A61B 5/117 382/116 |
| 2014/0118520 A1 | 5/2014 | Slaby et al. | |
| 2015/0033305 A1* | 1/2015 | Shear | G06F 21/45 726/11 |
| 2015/0227790 A1* | 8/2015 | Smits | G06K 9/00604 348/78 |
| 2015/0254508 A1* | 9/2015 | Kimura | G06K 9/0061 382/117 |
| 2017/0109511 A1* | 4/2017 | Dass | G06K 9/00926 |
| 2017/0160811 A1* | 6/2017 | Tanabe | G06F 13/00 |
| 2017/0263192 A1* | 9/2017 | Luna | G09G 3/3406 |
| 2017/0308690 A1* | 10/2017 | Tsukamoto | G06T 7/00 |

\* cited by examiner

MOBILE DEVICE FOR IRIS BASED AUTHENTICATION AND CONTROLLING METHOD THEREOF

CROSS-REFERENCE TO RELATED APPLICATION

Pursuant to 35 U.S.C. § 119(a), this application claims the benefit of earlier filing date and right of priority to Korean Application No. 10-2016-0069661, filed on Jun. 3, 2016, the contents of which are hereby incorporated by reference herein in their entirety.

BACKGROUND OF THE INVENTION

Field of the Invention

The present invention relates to a mobile device, and more particularly, to a mobile device and controlling method thereof. Although the present invention is suitable for a wide scope of applications, it is particularly suitable for determining a presence or non-presence of a forgery of an iris more efficiently and accurately by differentiating an iris guide method according to external illuminance.

Discussion of the Related Art

Generally, iris authentication indicates a technology of recognizing a person using iris information of an eyeball having unique property of each person or means such an authentication system. An iris has unique patterns more than those of a fingerprint and is recognizable accurately in a glass or lens worn state. Since iris authentication is a non-contact type, it has no repulsion advantageously. Specifically, such an iris authentication technology is widely applied to such fields as an access control, a computer security, an e-commerce authentication and the like.

As the iris authentication technology has applied throughout the industry, various iris forging methods have appeared. For instance, authentication is attempted in a manner of outputting an iris image through a high-resolution printer, fabricating an iris image into a lens type, outputting an iris image to a 3D artificial eye, or the like.

In order to prevent such an iris forgery, such a method as a liveness test or the like is applied. Representatively, there are an eye blinking check, a pupil motion check, a reflective object information check by IR illumination, and the like.

SUMMARY OF THE INVENTION

Accordingly, embodiments of the present invention are directed to a mobile device and controlling method thereof that substantially obviate one or more problems due to limitations and disadvantages of the related art.

One object of first to fifth embodiments of the present invention is to provide a mobile device and controlling method thereof, by which a presence or non-presence of a forged iris can be determined more efficiently using the property of a pupil responding to various external conditions.

Technical tasks obtainable from the present invention are non-limited by the above-mentioned technical tasks. And, other unmentioned technical tasks can be clearly understood from the following description by those having ordinary skill in the technical field to which the present invention pertains.

Additional advantages, objects, and features of the invention will be set forth in the disclosure herein as well as the accompanying drawings. Such aspects may also be appreciated by those skilled in the art based on the disclosure herein.

To achieve these objects and other advantages and in accordance with the purpose of the invention, as embodied and broadly described herein, a mobile device according to one embodiment of the present invention may include a memory configured to register a first iris image, an illumination sensor configured to sense an external illuminance of the mobile device, a display configured to emit a light from a preset region, a camera configured to detect either a second iris image or a pupil image, and a controller configured to control the memory, the illumination sensor, the camera and the display and control the display to display a message for guiding a change of an eye according to the external illuminance sensed by the illumination sensor, wherein the message for guiding the change of the eye is changed according to the sensed external illuminance.

Accordingly, embodiments of the present invention provide various effects and/or features.

First of all, a mobile device and controlling method thereof according to one embodiment of the present invention use a prescribed region of a display as a visible light illumination, thereby providing a more convenient and efficient authentication process.

Secondly, a mobile device and controlling method thereof according to another embodiment of the present invention provide various forgery preventing methods varying according to an external illuminance, thereby providing a more accurate forgery preventing process.

Effects obtainable from the present invention may be non-limited by the above mentioned effects. And, other unmentioned effects can be clearly understood from the following description by those having ordinary skill in the technical field to which the present invention pertains.

It is to be understood that both the foregoing general description and the following detailed description of the present invention are exemplary and explanatory and are intended to provide further explanation of the invention as claimed.

DETAILED DESCRIPTION OF THE INVENTION

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1A:
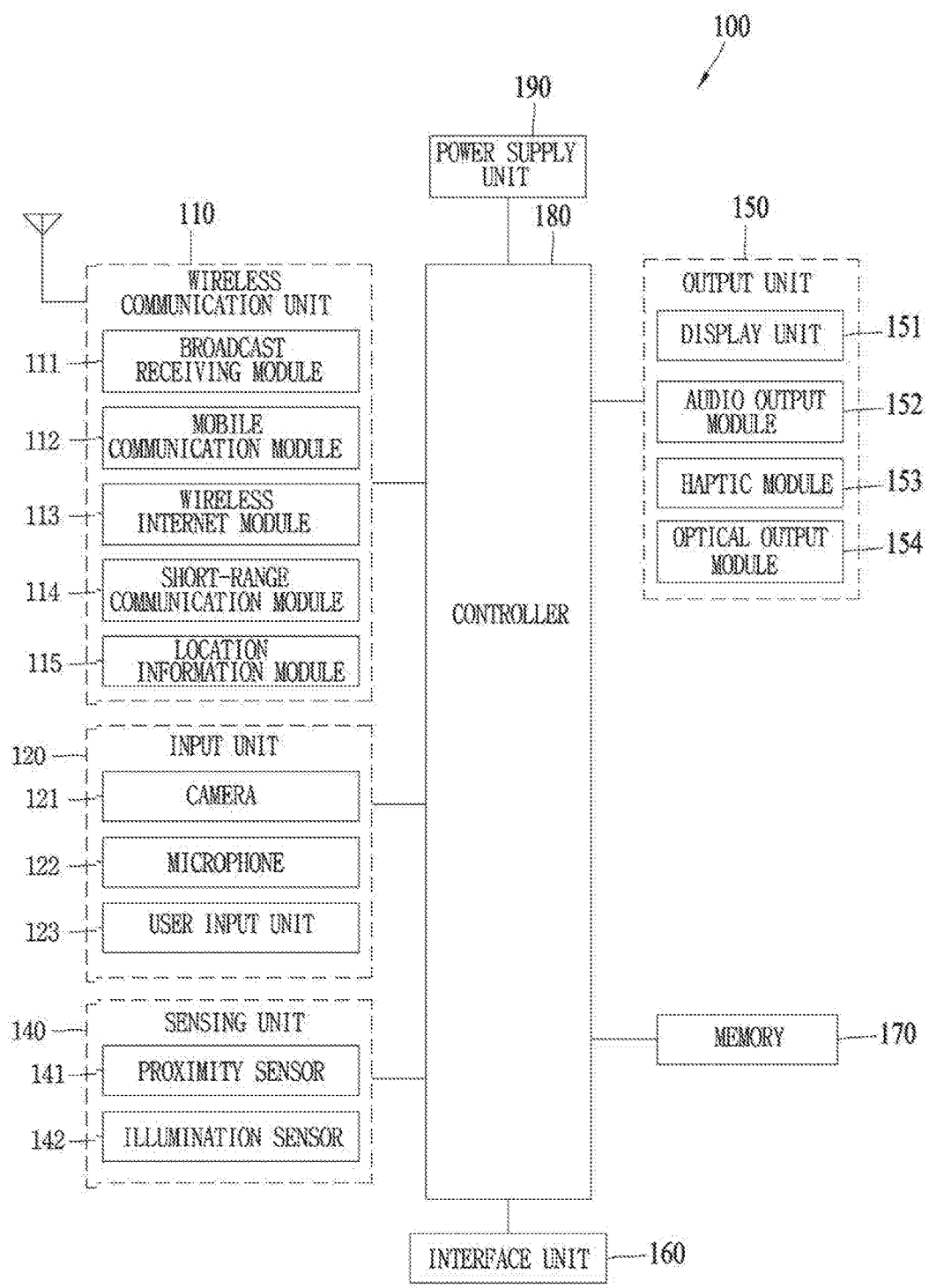
FIG. 1A is a block diagram of a mobile terminal in accordance with the present disclosure.
Figure 1B:
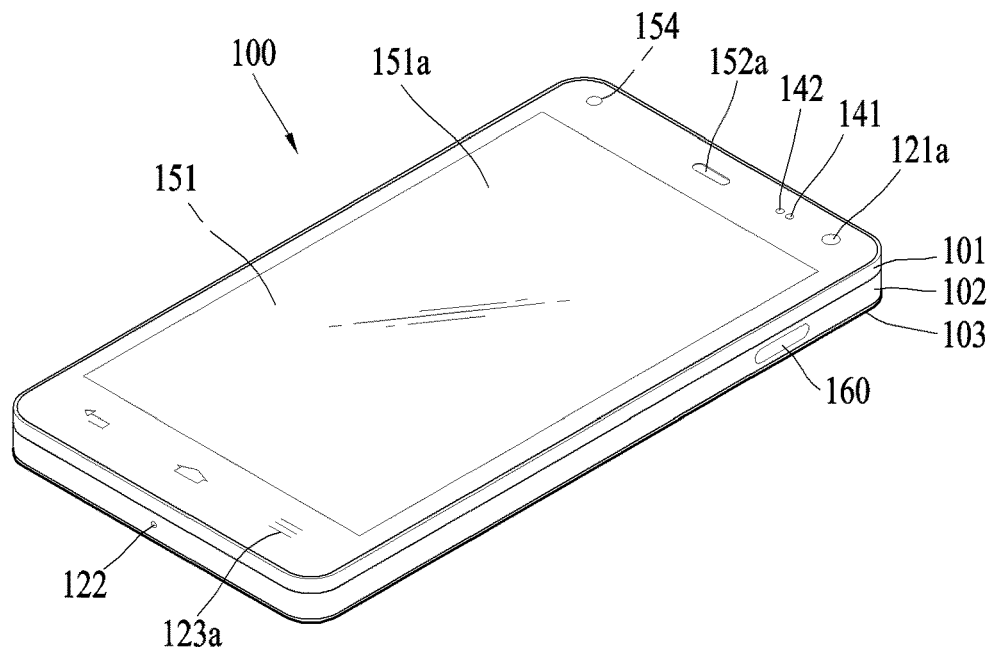
FIGS. 1B and 1C are conceptual views of one example of the mobile terminal, viewed from different directions.
Figure 1C:
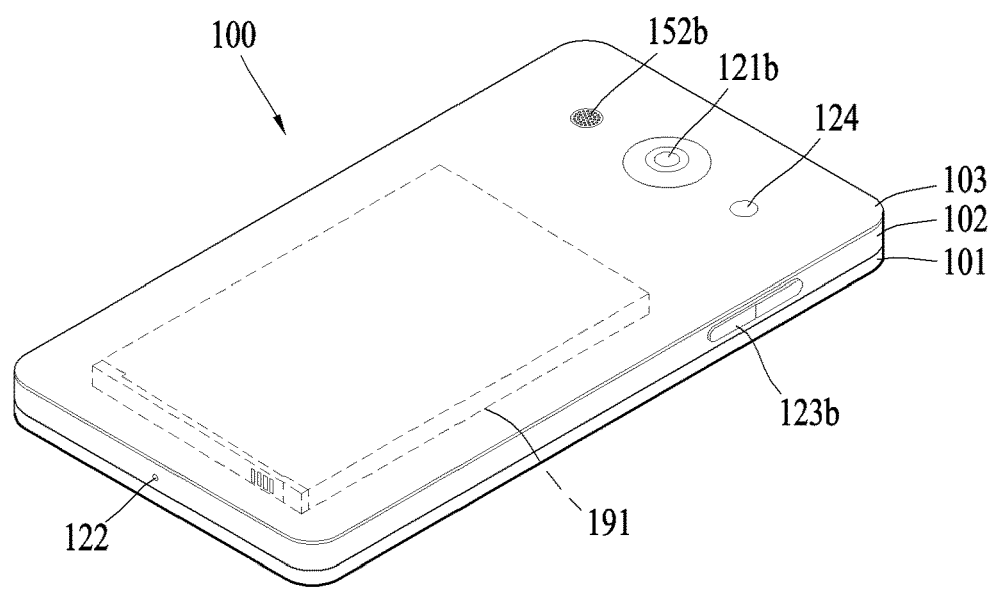

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

Referring now to FIG. 1A, the mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142.

If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the various components depicted in FIG. 1A, or activating application programs stored in the memory 170. As one example, the controller 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Referring still to FIG. 1A, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The broadcast managing entity may be implemented using a server or system which generates and transmits a broadcast signal and/or broadcast associated information, or a server which receives a pre-generated broadcast signal and/or broadcast associated information, and sends such items to the mobile terminal. The broadcast signal may be implemented using any of a TV broadcast signal, a radio broadcast signal, a data broadcast signal, and combinations thereof, among others. The broadcast signal in some cases may further include a data broadcast signal combined with a TV or radio broadcast signal.

The broadcast signal may be encoded according to any of a variety of technical standards or broadcasting methods (for example, International Organization for Standardization (ISO), International Electrotechnical Commission (IEC), Digital Video Broadcast (DVB), Advanced Television Systems Committee (ATSC), and the like) for transmission and reception of digital broadcast signals. The broadcast receiving module 111 can receive the digital broadcast signals using a method appropriate for the transmission method utilized.

Examples of broadcast associated information may include information associated with a broadcast channel, a broadcast program, a broadcast event, a broadcast service provider, or the like. The broadcast associated information may also be provided via a mobile communication network, and in this case, received by the mobile communication module 112.

The broadcast associated information may be implemented in various formats. For instance, broadcast associated information may include an Electronic Program Guide (EPG) of Digital Multimedia Broadcasting (DMB), an Electronic Service Guide (ESG) of Digital Video Broadcast-Handheld (DVB-H), and the like. Broadcast signals and/or broadcast associated information received via the broadcast receiving module 111 may be stored in a suitable device, such as a memory 170.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like). Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution- Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input.

Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

In general, a 3D stereoscopic image may include a left image (e.g., a left eye image) and a right image (e.g., a right eye image). According to how left and right images are combined into a 3D stereoscopic image, a 3D stereoscopic imaging method can be divided into a top-down method in which left and right images are located up and down in a frame, an L-to-R (left-to-right or side by side) method in which left and right images are located left and right in a frame, a checker board method in which fragments of left and right images are located in a tile form, an interlaced method in which left and right images are alternately located by columns or rows, and a time sequential (or frame by frame) method in which left and right images are alternately displayed on a time basis.

Also, as for a 3D thumbnail image, a left image thumbnail and a right image thumbnail can be generated from a left image and a right image of an original image frame, respectively, and then combined to generate a single 3D thumbnail image. In general, the term "thumbnail" may be used to refer to a reduced image or a reduced still image. A generated left image thumbnail and right image thumbnail may be displayed with a horizontal distance difference there between by a depth corresponding to the disparity between the left image and the right image on the screen, thereby providing a stereoscopic space sense.

A left image and a right image required for implementing a 3D stereoscopic image may be displayed on the stereoscopic display unit using a stereoscopic processing unit. The stereoscopic processing unit can receive the 3D image and extract the left image and the right image, or can receive the 2D image and change it into a left image and a right image.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the mobile terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

FIGS. 1B and 1C depict certain components as arranged on the mobile terminal. However, it is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 1C, a flash 124 is shown adjacent to the second camera 121b. When an image of a subject is captured with the camera 121b, the flash 124 may illuminate the subject.

As shown in FIG. 1B, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

Figure 2:
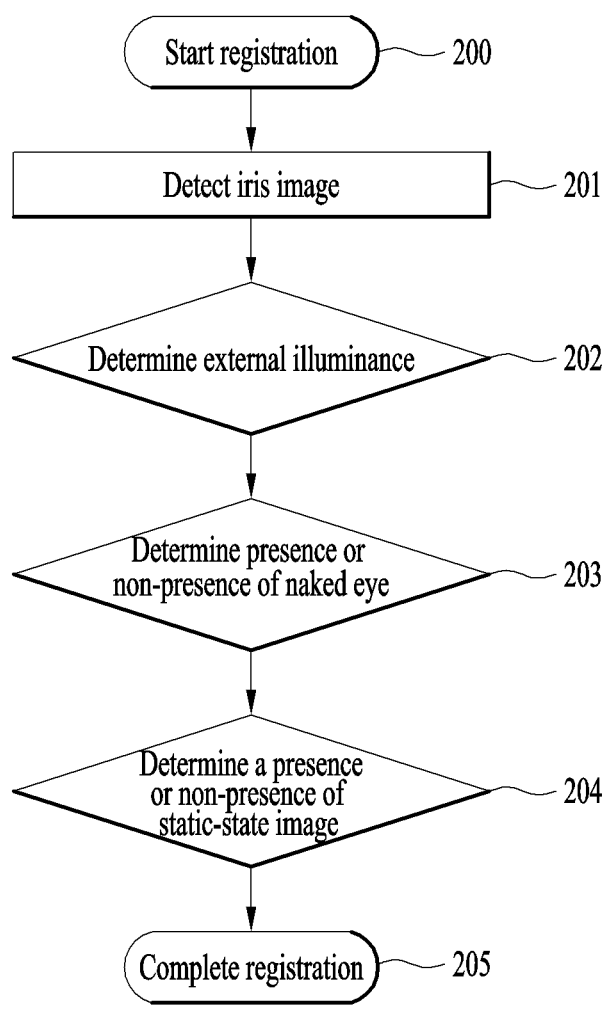
FIG. 2 is a flowchart of a process for registering an iris image.

FIG. 2 is a flowchart of a process for registering an iris image. In particular, FIG. 2 is a diagram of a process for registering a first iris image, which becomes a basis for determining whether a second iris image is forged, at a memory of a mobile device. A mobile device described with reference to FIGS. 2 to 14 can be supplementarily construed by referring to the mobile terminal described with reference to FIG. 1.

Referring to FIG. 2, if a registration of a first iris image starts [S200], a camera detects an iris image by photographing user's eye region [S201].

Generally, in an environment with a considerably high or low illuminance, it is difficult to detect an iris image correctly. Hence, a controller of a mobile device senses an external illuminance by controlling an illuminance sensor and then determines whether the external illuminance is 100~500 1× for example [S202].

Subsequently, the controller determines a presence or non-presence of a naked eye based on the detected iris image [S203]. While a user wears an accessory such as glasses or the like, it is difficult to perform an accurate iris authentication process due to such an effect as a light reflection by lens or the like.

Subsequently, the controller determines whether the detected iris image is an iris image in a static state without motion [S204]. Since iris authentication is performed in various external environments, an iris registering process for iris authentication requires an iris image of high quality.

After the steps S201 to S204, the detected first iris image is registered as a normal iris image [S205]. If any one of the steps S202 to S204 is determined as inappropriate by the controller, the controller controls an iris image to be detected again.

Figure 3:
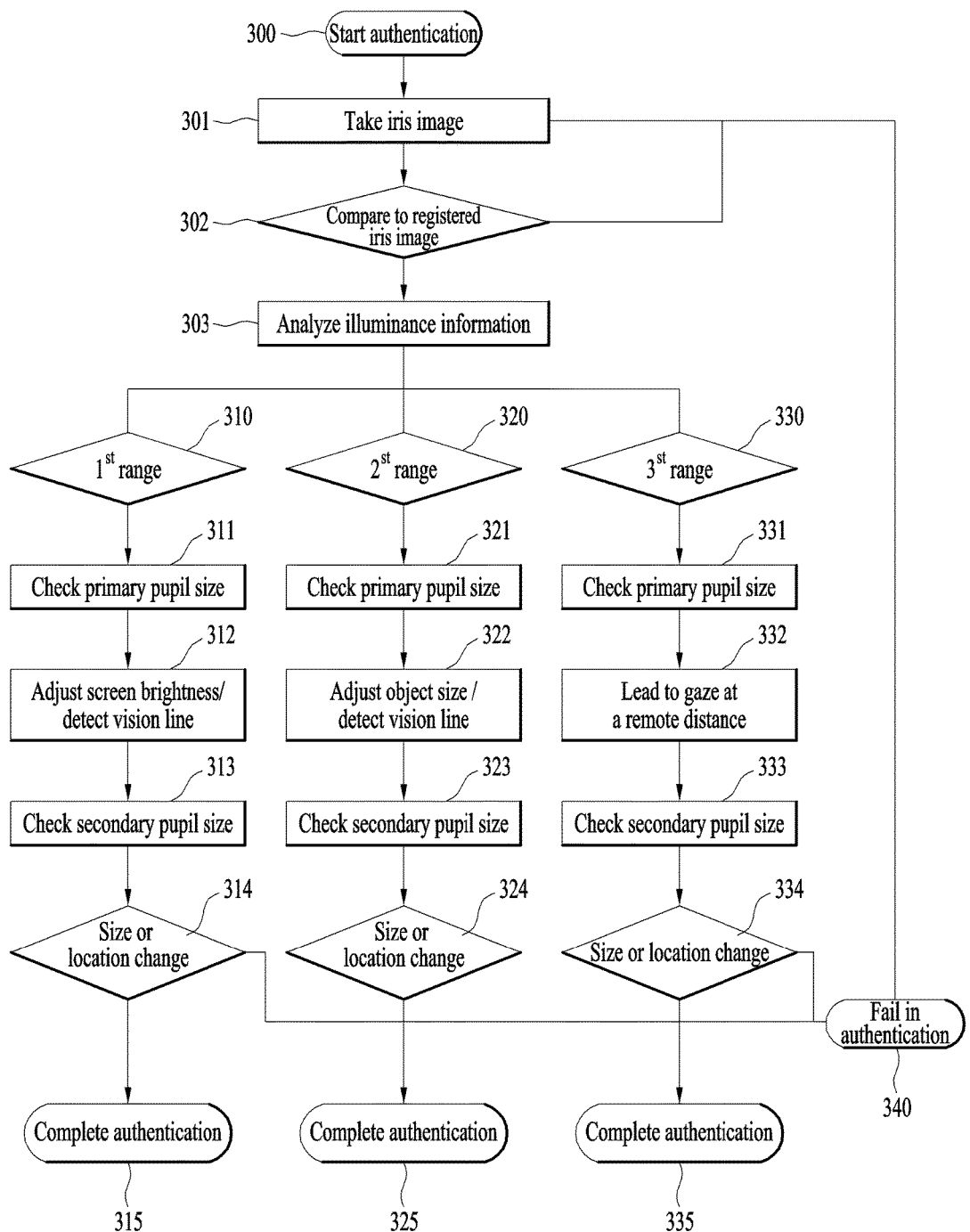
FIG. 3 is a flowchart of a process for determining whether an iris is forged according to first to fifth embodiments of the present invention.

FIG. 3 is a flowchart of a process for implementing an invention according to first to fifth embodiments of the present invention. In the following description, on the assumption that a first iris image is registered (e.g., the process mentioned in FIG. 2), a process for detecting a second iris image and then determining whether the detected second iris image matches the first iris image and whether the detected second iris image is forged is described. Particularly, an iris forgery determining process varying according to an external illuminance environment shall be described.

The method invention shown in FIG. 3 shall be schematically described with reference to the mobile device (e.g., mobile terminal) shown in FIG. 1.

First of all, the first iris image is registered at the memory 170 shown in FIG. 1A and the illumination sensor 141 senses an external illuminance of the mobile device 100.

Furthermore, the display 151 shown in FIG. 1A emits light from a preset region and the camera 121 detects a second iris image or a pupil image.

The controller 180 controls the memory 170, the illumination sensor 141, the camera 121 and the display 151 and further displays a message, which guides a variation of an eye by controlling the display 151 according to the external illuminance sensed by the illumination sensor 141. The message for guiding the variation of the eye is characterized in being changed according to the sensed external illuminance for example.

Details will be described with reference to FIG. 3 as follows.

First of all, a liveness test is the test for determining whether the detected second iris image is forged, and more particularly, whether a size or location of user's pupil is changed on a specific condition. So to speak, it is determined whether the corresponding pupil is a live pupil that is not forged.

In FIG. 3, a step S301 of photographing a second iris image, a step S302 of determining a match to a registered first iris image, a step S303 of sensing an external illuminance by an illumination sensor, and steps S310 to S335 of determining whether a second iris image is forged according to the external illuminance are experimentally performed within 30 ms.

In the following description, an indoor illuminance environment without illumination, an indoor illuminance environment with illumination and an outdoor illuminance environment are set to a first range (below 100 1×), a second range (100-500 1×) and a third range (above 1,500 1×), respectively. Furthermore, the first to third ranges can be set differently by a mobile device user in advance and are the experimental values to describe the present invention. If the present invention is implemented using numerical values of partially changed luminance, it naturally belongs to the scope of the appended claims and their equivalents.

A case that the external illuminance belongs to the first range is described as follows [S310 to S315].

The controller controls the illumination sensor to sense an external illuminance and determines whether the external illuminance belongs to the first range [S310]. In an external illuminance environment corresponding to the first range, whether the second iris image is forged is determined by a method of detecting a size change of a pupil according to display brightness and a method of detecting a movement (vision line) of a pupil.

First of all, in a state that display brightness is set to a maximum value by the controller, a pupil is primarily detected through the camera [S311]. Subsequently, the controller sets the display brightness to a minimum value [S312] and then detects the pupil through the camera secondarily [S313].

Alternatively, the controller controls the camera to determine whether the pupil is moving along a path displayed on a prescribed region of the display [S312].

The controller compares a size of the primarily detected pupil to that of the secondarily detected pupil or determines whether the pupil moves along the path [S314]. According to the determination, if the second iris image is determined as not forged, the authentication is completed [S315].

The steps S311 to S314 shall be described in detail with reference to FIGS. 4 to 7 later.

A case that the external illuminance belongs to the second range is described as follows [S320 to S325].

The controller controls the illumination sensor to sense an external illuminance and determines whether the external illuminance belongs to the second range [S320]. In an external illuminance environment corresponding to the second range, whether the second iris image is forged is determined by a method of detecting a size change of a pupil according to a size of an object and a method of detecting a movement (vision line) of a pupil.

First of all, when a user gazes at a first icon displayed on a prescribed region of a display, a pupil is primarily detected through the camera [S321]. Subsequently, the controller displays a second icon, which has the same shape of the first icon but differs from the first icon in size, on a prescribed region of the display [S322], enables the user to gaze at the second icon, and then detects the pupil through the camera secondarily [S323].

Alternatively, the controller controls the camera to determine whether the pupil is moving along a path displayed on the prescribed region of the display [S322].

The controller compares a size of the primarily detected pupil to that of the secondarily detected pupil or determines whether the pupil moves along the path [S324]. According to the determination, if the second iris image is determined as not forged, the authentication is completed [S325].

The steps S321 to S324 shall be described in detail with reference to FIGS. 8 to 11 later.

A case that the external illuminance belongs to the third range is described as follows [S330 to S335].

The controller controls the illumination sensor to sense an external illuminance and determines whether the external illuminance belongs to the third range [S330]. In an external illuminance environment corresponding to the third range, whether the second iris image is forged is determined by a method of detecting a size change of a pupil according to a focal distance.

First of all, when a user gazes at a display illumination region, a pupil is primarily detected through the camera [S331]. Subsequently, the controller enables the user to gaze at a remote object [S332] and then detects the pupil through the camera secondarily [S333].

The controller compares a size of the primarily detected pupil to that of the secondarily detected pupil [S334]. Accordingly, if the second iris image is determined as not forged, the authentication is completed [S335].

The steps S331 to S334 shall be described in detail with reference to FIG. 13 and FIG. 14 later.

According to another embodiment of the present invention, depending on a security level of a function desired to be performed through a mobile device, as shown in Table 1, a determination through a detection of a pupil size variation or both a determination through a detection of a pupil size variation and a determination of a presence or non-presence of a movement of a pupil can be set to be requested by a user in advance.

TABLE 1

| Security level | Function | Required determination |
|---|---|---|
| 1 | Unlock, music listening, etc. | Detect pupil size variation |
| 2 | Payment, personal information check, etc. | Detect pupil size variation and pupil movement |

According to further embodiment of the present invention, in case that the present invention applies to an operation of unlocking a mobile device, an iris authentication process can be progressed only if a user's action of pushing a home button precedes. Generally, while a display is turned off, a user often gazes at a display screen instead of a mirror. Hence, in this case, a lock screen is maintained to cope with user's intention.

Figure 4:
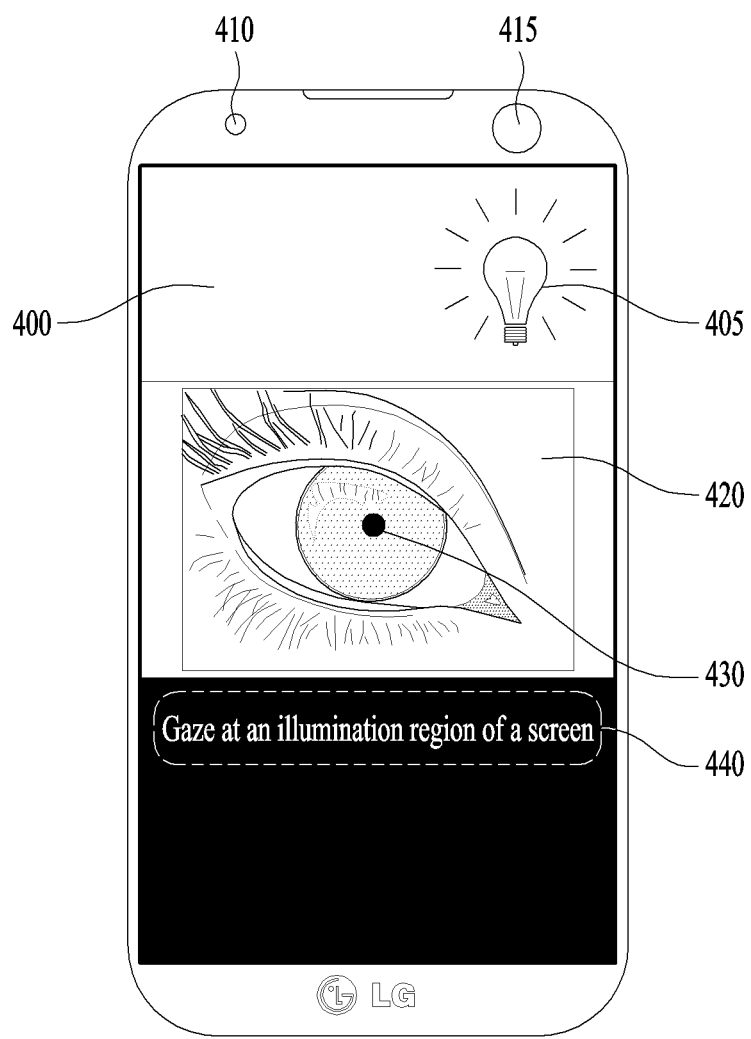
FIG. 4 and FIG. 5 are diagrams of a process for detecting a size of a pupil in association with the first embodiment of the present invention.
Figure 5:
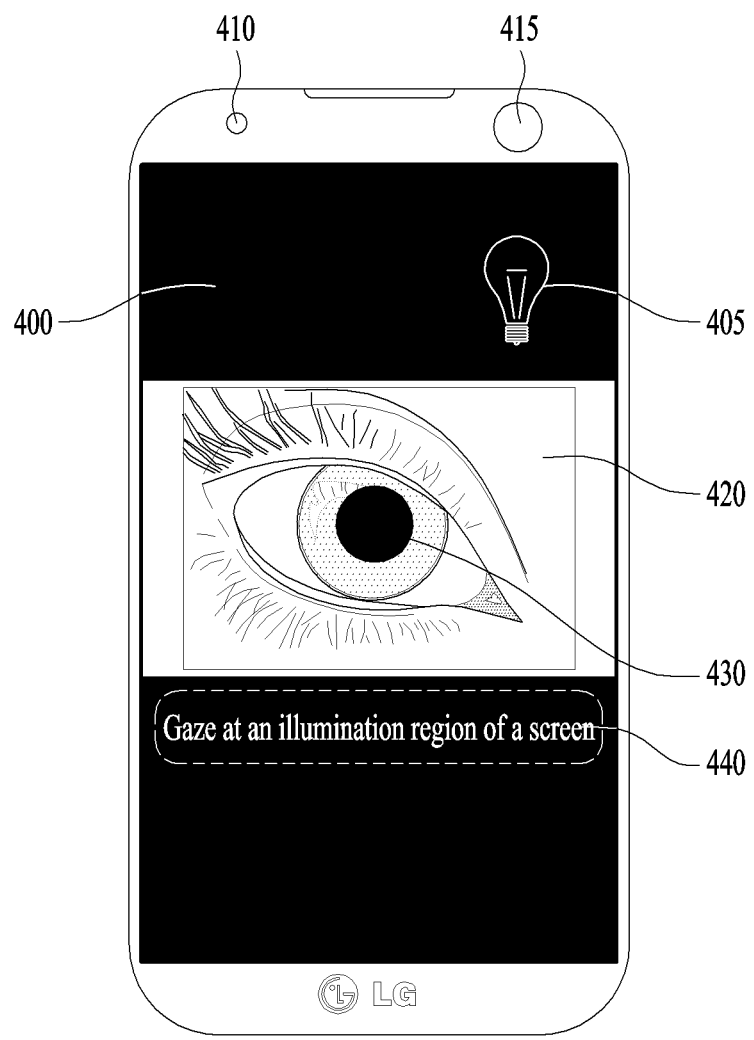

FIG. 4 and FIG. 5 are diagrams of a process for detecting a size of a pupil in association with the first embodiment of the present invention. With reference to FIG. 4 and FIG. 5, a process for determining whether a second iris image is forged by detecting a variation of a size of a pupil according to display brightness is described in detail as follows.

Generally, a size of a pupil varies 2.0 mm to 7.9 mm according to external illuminance. Using such a pupil property, it is able to make a determination of a presence or non-presence of a forgery of a second iris image.

According to a first embodiment of the present invention shown in FIG. 4, if an external illuminance sensed by an illumination sensor (not shown) belongs to a first range, a controller controls a display to enable a brightness of an illumination region 400 to have a maximum value.

A message 440 indicating that 'Gaze at an illumination region of a screen.' is displayed on a prescribed region of the display, and a user then gazes at an illumination icon 405 displayed on the illumination region 400. In doing so, a camera 415 photographs a user's eye region 420 and the controller primarily detects a size of a pupil 430 reduced within the eye region 420.

According to a second embodiment of the present invention shown in FIG. 5, the controller controls the display to enable the brightness of the illumination region 400 to have a minimum value.

The message 440 indicating that 'Gaze at an illumination region of a screen.' is displayed on the prescribed region of the display, and the user then gazes at the illumination icon 405 displayed on the illumination region 400. In doing so, the camera 415 photographs the user's eye region 420 and the controller secondarily detects a size of the pupil 430 enlarged within the eye region 420.

Based on the primarily and secondarily detected pupil images, the controller calculates a size variation of the pupil and then determines whether the calculated size variation is equal to or greater than a preset threshold.

If the calculated size variation is equal to or greater than the preset threshold, the controller completes the authentication by determining that a second iris image is not forged. On the contrary, if the calculated size variation is smaller than the preset threshold, the controller outputs a message indicating a failure of the authentication by determining that the second iris image is forged and controls the iris image to be taken again. In doing so, the outputted message may include a message of vibration or the like for example.

According to another example of the first embodiment of the present invention, as a display brightness is changed, the controller consecutively detects size variations of the pupil. In particular, by changing the brightness of the illumination region 400 from a maximum value to a minimum value, the controller can consecutively detect the size of the pupil 430. As the controller consecutively detect the size of the pupil 430, it is possible to determine a presence or non-presence of a forgery of a second iris with accuracy higher than that of a case of detecting the size twice.

Figure 6:
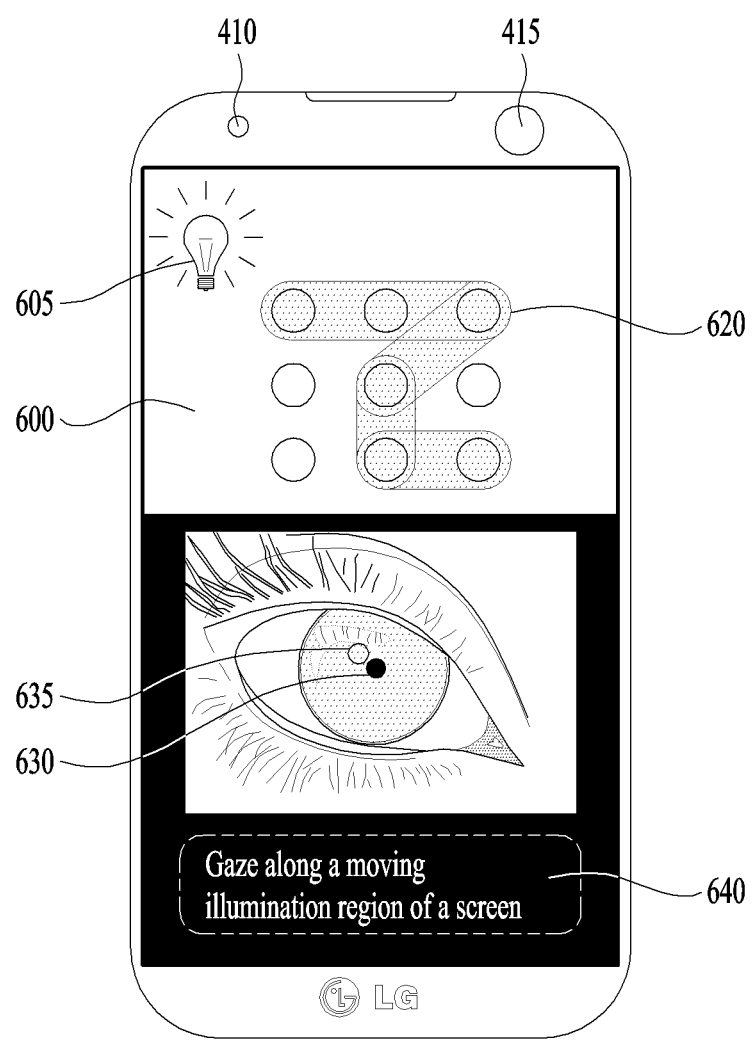
FIG. 6 and FIG. 7 are diagrams of a process for detecting a movement of a pupil in association with the second embodiment of the present invention.
Figure 7:
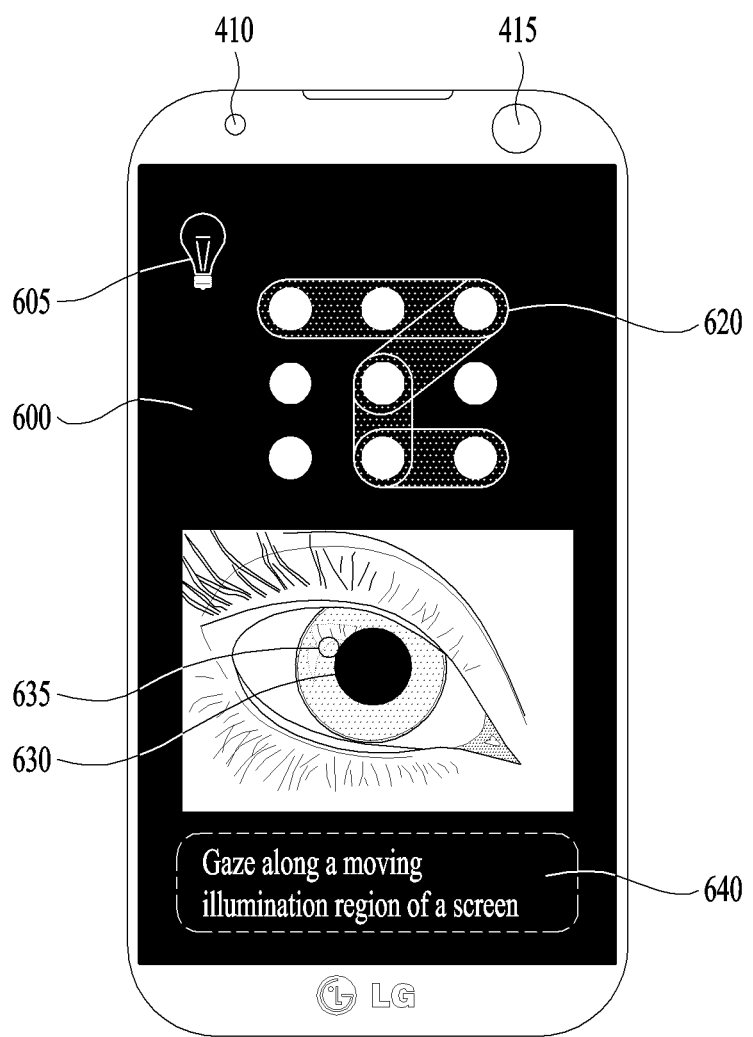

FIG. 6 and FIG. 7 are diagrams of a process for detecting a movement of a pupil in association with the second embodiment of the present invention.

First of all, if an external illuminance sensed by an illumination sensor (not shown) belongs to a first range, a controller controls a display to enable a brightness of an illumination region 600 to have a maximum value and is able to determine whether a second iris image is forged by detecting a location change of a pupil.

In order to detect the location change of the pupil, a vision line detecting method by corneal reflex may apply thereto. Namely, if a near infrared light is applied to an eye region by a near infrared LED 410, a camera 415 detects a light reflected by a cornea. As a location of a reflective point 635 is displayed on a display, a controller can detect a movement of the pupil.

Referring to FIG. 6, the controller determines whether the pupil moves along a path 620 displayed on the illumination region 600 of the display. For instance, an illumination icon 605 displayed on the illumination region 600 moves along a path 620 that is set randomly. If the controller outputs a message indicating 'Gaze along a moving illumination region of a screen', a user moves a vision line along a movement of the illumination icon 605. In doing so, the controller determines whether the reflective point 635 of the pupil accurately moves along the illumination icon 605.

If the reflective point 635 of the pupil accurately moves along the illumination icon 605, the controller completes the authentication by determining that the second iris image is not forged. On the contrary, if the illumination icon 605 fails to move accurately, the controller outputs a message indicating a failure of the authentication by determining that the second iris image is forged and controls an iris image to be taken again. In doing so, the outputted message may include a message of vibration or the like for example.

Meanwhile, according to another example of the second embodiment of the present invention, the path 620 may include a specific path configured by a mobile device user in advance instead of the random path. Thus, according to another example of the second embodiment of the present invention, a higher security level can be set for the technology of an iris authentication or an iris forgery prevention.

According to further example of the second embodiment of the present invention, a controller can detect a size change of a pupil according to a display brightness as soon as detect a location change of the pupil. In particular, the pupil is primarily detected by setting the display brightness to a maximum value [cf. FIG. 6], and is then secondarily detected by setting the display brightness to a minimum value [cf. FIG. 7]. In the course of the primary and secondary detections, it is also detected whether a location of the pupil is changed along the path 620 displayed on the illumination region 600 of the display. For reference, the following description is made in comparison between FIG. 6 and FIG. 7. The display brightness of the illumination region 600 shown in FIG. 6 is the maximum value, while the display brightness of the illumination region 600 shown in FIG. 7 is the minimum value.

Figure 8:
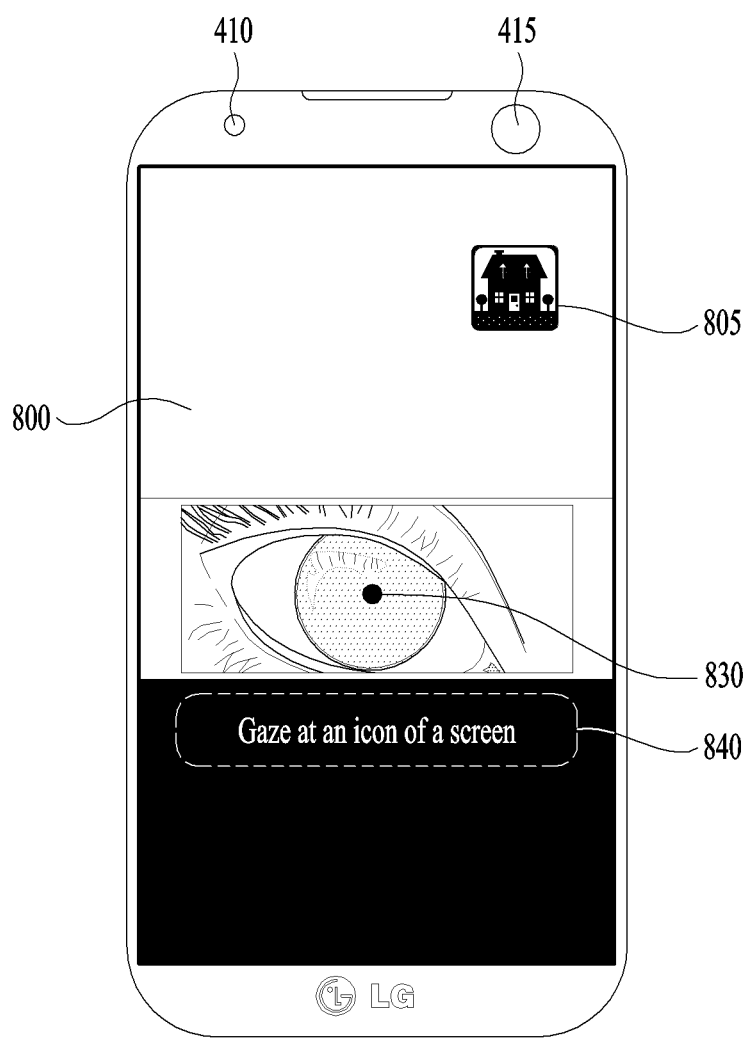
FIGS. 8 to 10 are diagrams of a process for detecting a size of a pupil in association with the third embodiment of the present invention.
Figure 9:
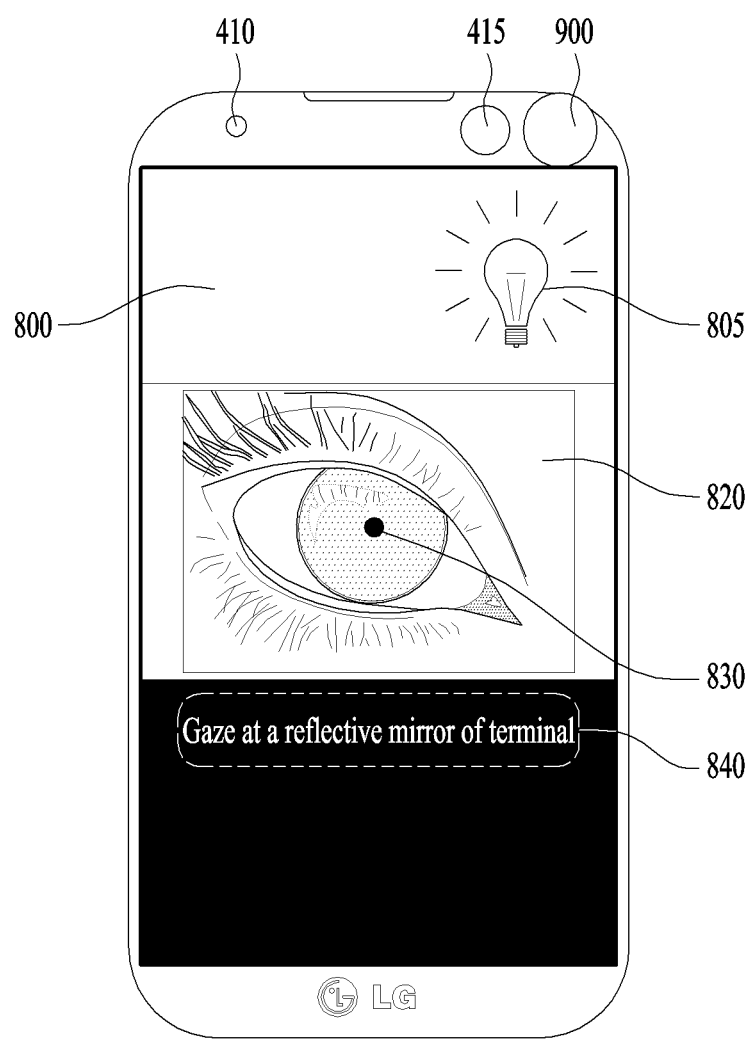
Figure 10:
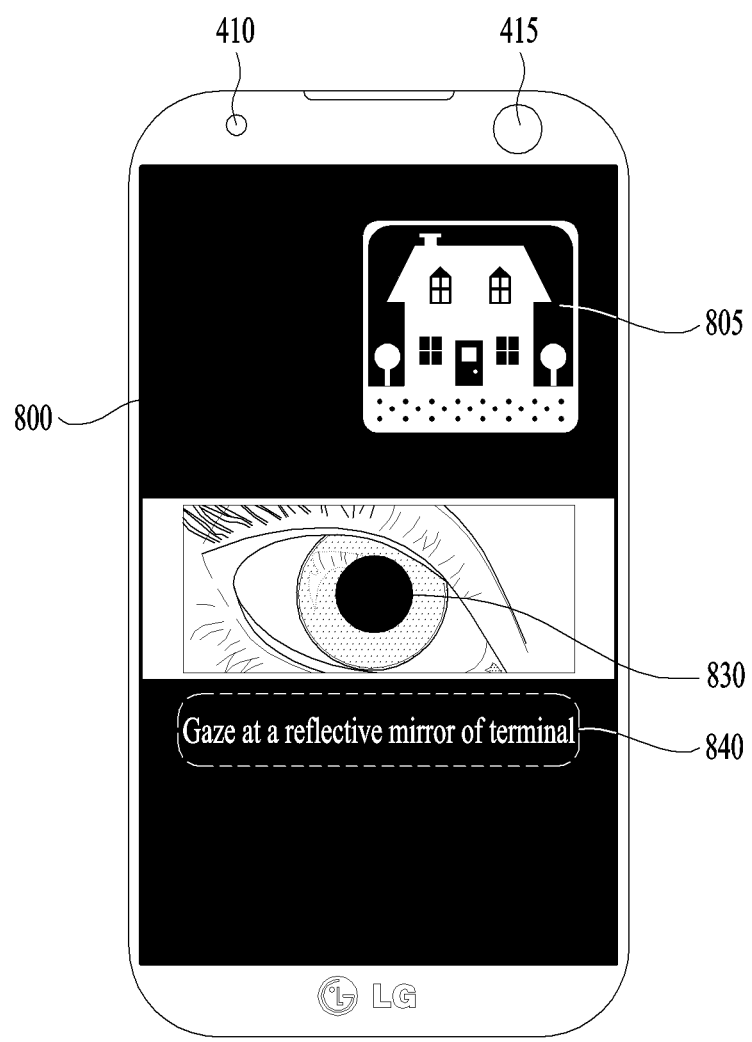

FIGS. 8 to 10 are diagrams of a process for detecting a size of a pupil in association with the third embodiment of the present invention. A pupil size change according to a display brightness has been described with reference to FIG. 4 and FIG. 5 already. A size change of a pupil according to a focal distance change shall be described in detail with reference to FIGS. 8 to 10 as follows.

First of all, a size of a pupil normally changes according to a focal distance. In particular, the pupil increases on looking at a far object, or decreases on looking at a near object. If an external illumination belongs to a second range, a size change of the pupil according to a display brightness may be greater than that of the pupil according to a focal distance. Hence, using such a property of the pupil, it is able to determine whether a second iris image is forged.

According to a third embodiment of the present invention shown in FIG. 8, if an external illuminance sensed by an illumination sensor (not shown) belongs to a second range, a controller controls a display to enable a brightness of an illumination region 800 to have a maximum value.

The controller controls the display to output a message 840 'Gaze at an icon of a screen'. If a user gazes at a first icon 805 within the illumination region 800, a camera 415 captures a user's eye region. The controller primarily detects a size of a pupil 830 from the captured eye region.

In doing so, a size of the first icon 805 is set to a minimum value. As the user looks at the first icon 805, it brings an effect of looking at a far object, i.e., an effect of increasing a focal distance. As the focal distance is increased, the pupil is enlarged.

According to another example of the third embodiment of the present invention, it may have an effect that a focal distance is increased through a reflective mirror 900. In case that the user gazes at the reflective mirror, since an image becomes focused at a location amounting to a twice of a distance between the pupil and the mirror, it brings an effect of increasing the focal distance.

When it is difficult to look at a far object in a room or it is inconvenient to look at a far object after gazing at a near mobile device, according to another example of the third embodiment of the present invention, it may bring an effect of increasing a focal distance.

The reflective mirror 900 may be separately provided to a prescribed region of the mobile device. Alternatively, the reflective mirror 900 may be provided as a camera having a filter of a mirror property installed therein. In particular, unlike FIG. 9, the camera 415 and the reflective mirror 900 may be provided as a single configuration to the mobile device.

According to a third embodiment of the present invention shown in FIG. 10, the controller controls the display to enable a brightness of the illumination region 800 to have a minimum value.

The controller controls the display to output a message 840 'Gaze at an icon of a screen'. If a user gazes at a second icon 805 within the illumination region 800, the camera 415 captures a user's eye region. The controller secondarily detects a size of the pupil 830 from the captured eye region.

In doing so, although the second icon 805 has the same shape of the first icon 805, a size of the second icon 805 is set to a maximum value. As the user looks at the second icon 805, it brings an effect of looking at a near object, i.e., an effect of decreasing a focal distance. As the focal distance is decreased, the pupil is reduced.

Based on the primarily and secondarily detected pupil images, the controller calculates a size variation of the pupil and then determines whether the calculated size variation is equal to or greater than a preset threshold.

If the calculated size variation is equal to or greater than the preset threshold, the controller completes the authentication by determining that a second iris image is not forged. On the contrary, if the calculated size variation is smaller than the preset threshold, the controller outputs a message indicating a failure of the authentication by determining that the second iris image is forged and controls the iris image to be taken again. In doing so, the outputted message may include a message of vibration or the like for example.

Meanwhile, according to another example of the third embodiment of the present invention, in response to a change of a focal distance, the controller consecutively detects size changes of the pupil. In particular, by changing the size from the first icon 805 to the second icon 805, the controller consecutively detects the size of the pupil 830. As the controller consecutively detect the size of the pupil 830, it is possible to determine a presence or non-presence of a forgery of the second iris with accuracy higher than that of a case of detecting the size twice.

Figure 11:
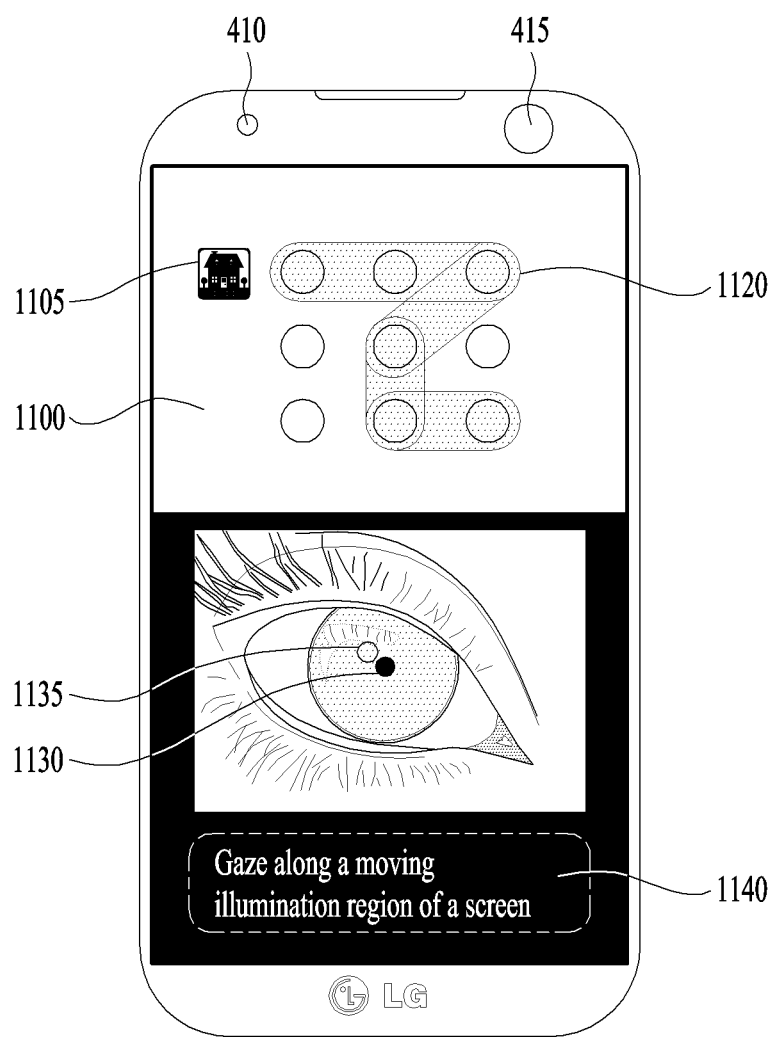
FIG. 11 and FIG. 12 are diagrams of a process for detecting a size of a pupil in association with the fourth embodiment of the present invention.
Figure 12:
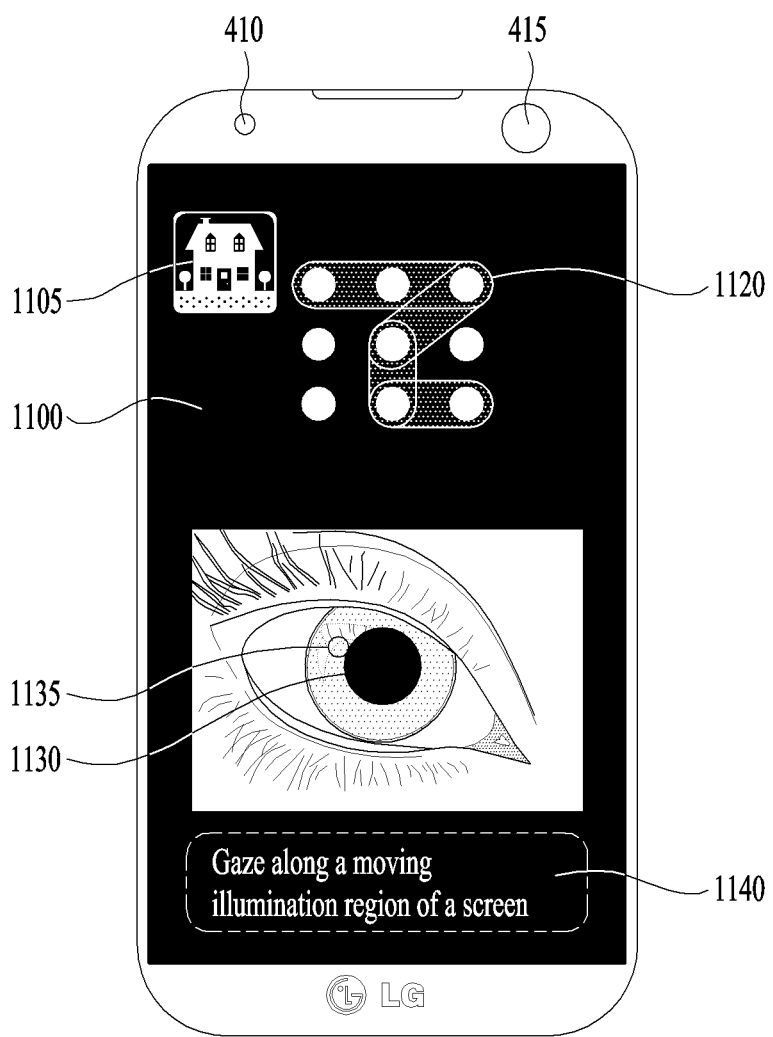

FIG. 11 and FIG. 12 are diagrams of a process for detecting a movement of a pupil in association with the fourth embodiment of the present invention.

First of all, if an external illuminance sensed by an illumination sensor (not shown) belongs to a second range, a controller controls a display to enable a brightness of an illumination region 1100 to have a maximum value and is able to determine whether a second iris image is forged by detecting a location change of a pupil.

In order to detect the location change of the pupil, a vision line detecting method by corneal reflex may apply thereto. Namely, if a near infrared light is applied to an eye region by a near infrared LED 410, a camera 415 detects a light reflected by a cornea. As a location of a reflective point 1135 is displayed on a display, a controller can detect a movement of the pupil.

Referring to FIG. 11, the controller determines whether the pupil moves along a path 1120 displayed on the illumination region 1100 of the display. For instance, an icon 1105 displayed on the illumination region 1100 moves along a path 1120 that is set randomly. If the controller outputs a message indicating 'Gaze along a moving illumination region of a screen', a user moves a vision line along a movement of the icon 1105. In doing so, the controller determines whether the reflective point 1135 of the pupil accurately moves along the icon 1105.

If the reflective point 1135 of the pupil accurately moves along the icon 1105, the controller completes the authentication by determining that the second iris image is not forged. On the contrary, if the icon 1105 fails to move accurately, the controller outputs a message indicating a failure of the authentication by determining that the second iris image is forged and controls an iris image to be taken again. In doing so, the outputted message may include a message of vibration or the like for example.

Meanwhile, according to another example of the fourth embodiment of the present invention, the path 1120 may include a specific path configured by a mobile device user in advance instead of the random path. Thus, according to the fourth embodiment of the present invention, a higher security level can be set for the technology of an iris authentication or an iris forgery prevention.

According to further example of the fourth embodiment of the present invention, a controller can detect a size change of a pupil according to a display brightness as soon as detect a location change of the pupil. In particular, the pupil is primarily detected by setting a display brightness to a maximum value and also setting a size of the icon 1105 to a minimum value [cf. FIG. 11], and is then secondarily detected by setting the display brightness to a minimum value [cf. FIG. 12]. In the course of the primary and secondary detections, it is also detected whether a location of the pupil is changed along the path 1120 displayed on the illumination region 1100 of the display.

For reference, the following description is made in comparison between FIG. 11 and FIG. 12. The display brightness of the illumination region 1100 shown in FIG. 11 is the maximum value, while the display brightness of the illumination region 1100 shown in FIG. 12 is the minimum value.

Figure 13:
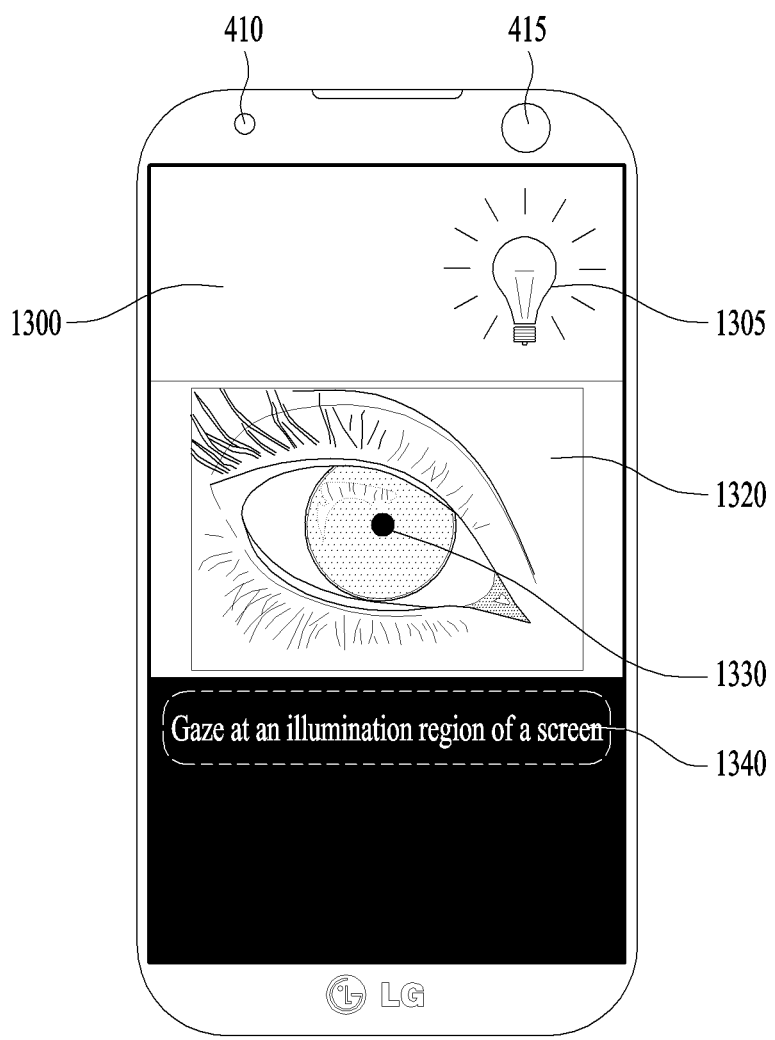
FIG. 13 and FIG. 14 are diagrams of a process for detecting a size of a pupil in association with the fifth embodiment of the present invention.
Figure 14:
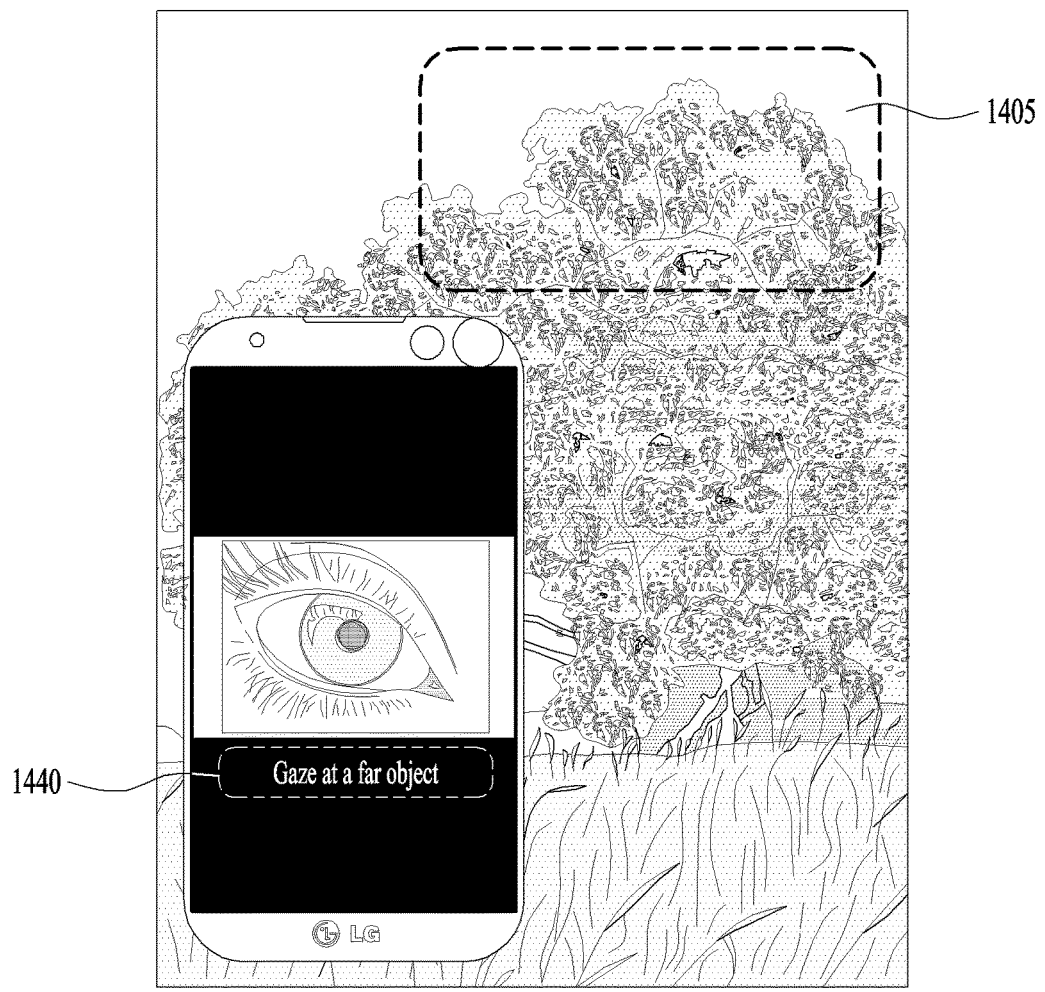

FIG. 13 and FIG. 14 are diagrams of a process for detecting a size of a pupil in association with the fifth embodiment of the present invention. With reference to FIG. 13 and FIG. 14, if an external illuminance belongs to a third range, a method of determining whether a second iris image is forged is described in detail as follows.

First of all, since a size of a pupil is reduced due to a very high illuminance (e.g., 1,500 1× or higher) in an outdoor illumination environment belonging to a third range, it is difficult to detect a size change of the pupil despite changing a display brightness of a mobile device. Moreover, due to a strong white light in an outdoor environment, it is difficult to accurately detect a location of the pupil by an IR light source. Hence, it is efficient to detect a pupil size change according to a focal distance.

According to a fifth embodiment of the present invention shown in FIG. 13, if an external illuminance detected by an illumination sensor (not shown) belongs to a third range, the controller controls a display to enable a brightness of the illumination region 1300 to have a maximum value.

The controller controls the display to output a message 1340 'Gaze at an illumination region of a screen'. If a user gazes at an illumination icon 1305 within the illumination region 1300, the camera 415 captures a user's eye region 1320. The controller primarily detects a size of the pupil 1330 from the captured eye region.

In doing so, since the user gazes at a near object, a size of the pupil is reduced by the principle of the pupil size change according to a focal distance, which is described with reference to FIGS. 8 to 10.

According to the fifth embodiment of the present invention shown in FIG. 14, the controller outputs a message 1440 'Gaze at a far object'. According to the message, if the user gazes at the far object 1405, the controller controls the camera to capture a user's eye region and then secondarily detect the size of the pupil from the captured eye region.

Based on the primarily and secondarily detected pupil images, the controller calculates a size variation of the pupil and then determines whether the calculated size variation is equal to or greater than a preset threshold.

If the calculated size variation is equal to or greater than the preset threshold, the controller completes the authentication by determining that a second iris image is not forged. On the contrary, if the calculated size variation is smaller than the preset threshold, the controller outputs a message indicating a failure of the authentication by determining that the second iris image is forged and controls the iris image to be taken again. In doing so, the outputted message may include a message of vibration or the like for example.

Terminologies used for the present invention are defined in consideration function in the present invention and may vary according to intentions, practices and the like of technicians working in the corresponding fields. Hence, the definitions should be made based on the overall contents of the present invention.

The above-described present invention can be implemented in a program recorded medium as computer-readable codes. The computer-readable media may include all kinds of recording devices in which data readable by a computer system are stored. The computer-readable media may include HDD (hard disk drive), SSD (solid state disk), SDD (silicon disk drive), ROM, RAM, CD-ROM, magnetic tapes, floppy discs, optical data storage devices, and the like for example and also include carrier-wave type implementations (e.g., transmission via Internet). Further, the computer may include a controller of a mobile device. It will be appreciated by those skilled in the art that various modifications and variations can be made in the present invention without departing from the spirit or scope of the inventions.

Thus, it is intended that the present invention covers the modifications and variations of this invention provided they come within the scope of the appended claims and their equivalents.

What is claimed is:

1. A mobile device, comprising:
    a memory configured to register and store a first iris image;
    an illumination sensor configured to sense an external illuminance of the mobile device;
    a display configured to emit a light from a preset region;
    a camera configured to detect either a second iris image or a pupil image; and
    a controller configured to:
        determine whether the second iris image or the pupil image is a match to the stored first iris image;
        control the memory, the illumination sensor, the camera and the display,
        control the display to display a message for guiding an eye motion according to the external illuminance sensed by the illumination sensor,
        when the sensed external illuminance belongs to a preset first range, control the display to set a display brightness to a maximum value and primarily detect the pupil image through the camera,
        control the display to set the display brightness to a minimum value and secondarily detect the pupil image through the camera,
        calculate a size variation of the pupil based on the primarily and secondarily detected pupil images, determine whether the calculated size variation is equal to or greater than a preset threshold,
determine whether the second iris image is forged according to the determination, and
display a result of the determination through the display,
wherein the message for guiding the eye motion is changed according to the sensed external illuminance.

2. The mobile device of claim 1, wherein when the sensed external illuminance belongs to the preset first range, the controller is further configured to control the display to change the display brightness to the minimum value from the maximum value, controls the camera to consecutively detect the pupil image, determines whether the size of the pupil is changed based on the detected pupil image, and determines whether the second iris image is forged according to the determination.

3. The mobile device of claim 1, wherein the controller is further configured to control the camera to detect the pupil, determines whether the pupil moves along a path displayed on a prescribed region of the display, and determines whether the second iris image is forged according to the determination.

4. The mobile device of claim 1, wherein if the sensed external illuminance belongs to a preset second range, the controller:
displays a message for guiding a user to gaze at a first icon displayed on a prescribed region of the display,
controls the camera to primarily detect the pupil image,
displays a message for guiding the user to gaze at a second icon displayed on the prescribed region of the display,
controls the camera to secondarily detect the pupil image,
determines whether a size variation of the pupil is equal to or greater than a preset threshold based on the primarily and secondarily detected pupil images, and
determines whether the second iris image is forged according to the determination, wherein each of the first icon and the second icon has a same shape, and wherein the first icon and the second icon differ from each other in size.

5. The mobile device of claim 1, wherein if the sensed external illuminance belongs to a preset second range, the controller:
displays a message for guiding a user to gaze at an icon displayed on a prescribed region of the display,
changes a size of the icon into a maximum value from a minimum value consecutively,
controls the camera to consecutively detect the pupil image,
determines whether a size of the pupil is changed based on the detected pupil image, and
determines whether the second iris image is forged according to the determination.

6. The mobile device of claim 4, wherein the controller controls the camera to detect the pupil, determines whether the pupil moves along a path displayed on a prescribed region of the display, and determines whether the second iris image is forged according to the determination.

7. The mobile device of claim 1, wherein if the sensed external illuminance belongs to a preset third range, the controller:
displays a message for guiding a user to gaze at an icon displayed on a prescribed region of the display,
controls the camera to primarily detect the pupil image,
displays a message for guiding the user to gaze at a far object,
controls the camera to secondarily detect the pupil image,
determines whether a size variation of the pupil is equal to or greater than a preset threshold based on the primarily and secondarily detected pupil images, and
determines whether the second iris image is forged according to the determination.

8. A method of controlling a mobile device, comprising the steps of:
registering and storing a first iris image at a memory;
detecting a second iris image or a pupil image through a camera after registering the first iris image at the memory;
determining whether the detected second iris image or the pupil image matches the first iris image registered at the memory to identify a user;
sensing an external illuminance of the mobile device;
displaying a message for guiding an eye motion according to the sensed external illuminance;
when the sensed external illuminance belongs to a preset first range, primarily detecting the pupil image in a state that a display brightness is set to a maximum value;
secondarily detecting the pupil image in a state that the display brightness is set to a minimum value;
determining whether a size variation of the pupil is equal to or greater than a preset threshold based on the primarily and secondarily detected pupil images;
determining whether the second iris image is forged according to the determination; and
displaying a result of the determination,
wherein the message for guiding the eye motion is changed according to the sensed external illuminance.

9. The method of claim 8, further comprising the steps of:
detecting the pupil;
determining whether the pupil moves along a path displayed on a prescribed region of the display; and
determining whether the second iris image is forged according to the determination.

10. The method of claim 8, comprising the steps of:
if the sensed external illuminance belongs to a preset second range, displaying a message for guiding a user to gaze at a first icon displayed on a prescribed region of the display;
primarily detecting the pupil image;
displaying a message for guiding the user to gaze at a second icon displayed on the prescribed region of the display;
secondarily detecting the pupil image;
determining whether a size variation of the pupil is equal to or greater than a preset threshold based on the primarily and secondarily detected pupil images; and
determining whether the second iris image is forged according to the determination,
wherein each of the first icon and the second icon has a same shape and
wherein the first icon and the second icon differ from each other in size.

11. The method of claim 10, further comprising the steps of:
detecting the pupil;
determining whether the pupil moves along a path displayed on a prescribed region of the display; and
determining whether the second iris image is forged according to the determination.

12. The method of claim 8, comprising the steps of:
if the sensed external illuminance belongs to a preset second range, displaying a message for guiding a user to gaze at an icon displayed on a prescribed region of the display;
changing a size of the icon into a maximum value from a minimum value consecutively;
consecutively detecting the pupil image through a camera;
determining whether a size of the pupil is changed based on the detected pupil image; and determining whether the second iris image is forged according to the determination.

13. The method of claim 8, comprising the steps of:

if the sensed external illuminance belongs to a preset third range, displaying a message for guiding a user to gaze at an icon displayed on a prescribed region of the display;

primarily detecting the pupil image;

displaying a message for guiding the user to gaze at a far object;

secondarily detecting the pupil image;

determining whether a size variation of the pupil is equal to or greater than a preset threshold based on the primarily and secondarily detected pupil images; and determining whether the second iris image is forged according to the determination.

14. The method of claim 8, the step of registering the first iris image at the memory, comprising:

a first step of detecting the first iris image through a camera;

a second step of determining whether the sensed external illuminance of the mobile device belongs to a preset range;

a third step of determining whether the eye is a naked eye based on the detected first iris image;

a fourth step of determining whether the first iris image is in a static state; and a fifth step of registering the first iris image at the memory according to results of the determinations of the second to fourth steps.

\* \* \* \* \*